Patented Dec. 26, 1933

1,940,807

UNITED STATES PATENT OFFICE 1,940,807

BITUMINOUS EMULSIONS AND PROCESS OF MAKING SAME

Leo Liberthson, New York, N. Y., assignor to L. Sonneborn Sons Inc.

No Drawing. Application January 9, 1930
Serial No. 419,727

8 Claims. (Cl. 134—1)

My invention relates particularly to aqueous emulsions of bituminous materials, and the term "bituminous", as herein employed, denotes generally those residual materials known in the petroleum and coal tar industries as asphalts and tars. I have found that emulsions of the type mentioned of exceptional stability may be made by the employment of a specially purified salt of green petroleum sulphonic acids, and that an emulsion of highly exceptional stability may be made by the joint use of finely divided clay, and a salt of the purified sulphonic acid referred to as stabilizing agents for the emulsion of bituminous material.

When petroleum oils are treated with fuming sulphuric acid, a black viscous sludge is formed which is insoluble in the oil phase and separable therefrom by stratification. This sludge contains sulphuric acid and organic acids formed by interaction of the fuming sulphuric acid with certain components of the oil. These organic acids form salts with bases and are water soluble ordinarily manifesting a green color in aqueous solution. These organic acids will be hereinafter referred to as green petroleum sulphonic acids, to distinguish them from other sulphonic acids which are found principally in the oil phase, and only limitedly in the sludge phase after treatment of a petroleum oil with fuming sulphuric acid.

The clay which I may use in combination with a salt of the green petroleum sulphonic acid is preferably a fine argillaceous material having at least 50% by weight of constituents passing 200 mesh. Clays which manifest in marked degree the capacity to form gels when mixed with water, appear to give best results and such clays will be hereinafter referred to as colloidal clays. Such clays ordinarily contain a relatively high proportion, as compared to ordinary clays, of aluminum sodium silicate, and frequently contain more than 10% of this constituent on the dry basis. An example of such a clay is bentonite.

The salts of the green sulphonic acids have been employed in stabilizing bituminous emulsions, but such salts normally carry certain associated materials, and I find that the preliminary removal of these associated materials enables me to form an emulsion of exceptional characteristics. The impurities referred to are not soluble in water per se, but unless specially removed are carried into water solution by the green petroleum sulphonic acids and/or the salts derived therefrom. I effect a preliminary separation of these impurities by dissolving the green sulphonic acids, or the water soluble salts thereof, in a solvent in which the acids, free or combined as the case may be, are soluble but in which the associated impurities are not soluble notwithstanding the presence of the organic acids. I may, for example, dissolve the green sulphonic acids or the parent material from which they are derived, viz, the sludge in an aqueous solution of ethyl alcohol containing from 40 to 60% ethyl alcohol by volume. Any alcohol of not exceeding 3 carbon atoms may be substituted for the ethyl alcohol, although ethyl alcohol is preferred. The proportion of total solute to total solvent may by way of example vary from one ninth to equal parts.

The green sulphonic acids together with any accompanying acidic material, such as sulphuric acid, are preferably neutralized with a base which forms water soluble green petroleum sulphonates, either prior to or while in contact with the alcoholic solution. Sodium or potassium basic compounds are examples of bases preferred for this purpose. If the sludge itself is subjected to this treatment, I find it further desirable to partially remove the sulphuric acid contained therein before using the alcoholic solution. This preliminary separation may be effected by admixing brine with the sludge which results in the formation of two phases; one of which contains the major part of the sulphuric acid and may be discarded leaving for my use a phase containing the major part of the organic acids. I prefer however, to make the preliminary separation of sulphuric acid by adding water to the sludge, the amount of water being so proportioned as to cause the formation of two phases; one of which contains the major part of the sulphuric acid originally present in the sludge and may be separated from the bulk of the sulphuric acid in the other phase.

The sludge, or the green petroleum sulphonic acids derived therefrom, is dissolved in the alcoholic solution referred to. While the material may be treated in acidic condition, it is preferably neutralized either prior to or while in contact with the alcoholic solution.

The effect of dissolving the green sulphonic acids in the alcoholic solution is to cause the separation of those materials hereinabove referred to which are not water soluble per se, but which are ordinarily carried into solution by the green sulphonic acids or the water soluble salts thereof. These materials may consist in part of higher alcohols, disulphids, thio-ethers, thio-alcohols, and may comprise hydrocarbons. I am aware of the fact that the green sulphonic acids have previously been separated into two components including an organic acid which is predominantly water soluble, and an organic acid which when isolated is not highly soluble in water; but such acids are not separated one from the other by the use of solvents which I employ, and the compounds which I separate are not organic acids. The substances separated by the treatment referred to will be hereinafter generically referred to as the non-acid organic compounds, and the expression, freed from non-acid organic compounds, as employed in the claims, will denote the process of freeing the organic acids from those non-acid organic compounds which would otherwise be carried into aqueous solution, this freeing being accomplished, for example, by dissolving the organic acids in a solvent in which the organic acids are soluble and in which the non-acid organic compounds are insoluble, notwithstanding the presence of the organic acids.

The solution of the organic acids and/or the salts resulting from the neutralization thereof, in the alcoholic solvent, results in the formation of a lower and heavier phase containing the non-acid organic compounds, which phase is separated and withdrawn leaving the upper phase containing the solvent and the green petroleum sulphonic acids or the salts thereof, which upper phase is selected for further treatment adapted to recover the salts of the green petroleum sulphonic acids for utilization in my process of stabilizing bituminous emulsions.

If the separation of the green petroleum sulphonic acids from the non-acid organic compounds has been carried out in acid condition, the purified sulphonic acids may be neutralized in solution; alternatively, the alcohol may be separated and recovered, and the acids may thereafter be neutralized. My preferred procedure however, is to neutralize the green organic acids in aqueous solution and thereafter add alcohol sufficient to make up the solvent containing alcohol and water in the proportion described. A sodium base is preferred as neutralizing agent, and this procedure appears to enhance the separation of the non-acid organic compounds from the organic acids or from the salts derived therefrom.

After separation of the non-acid organic compounds the alcoholic solution containing the purified sodium salt of the green petroleum sulphonic acids is partially distilled to recover the alcohol, and the residue containing water and purified salt is utilized for my purpose.

In making the bituminous emulsions, a small quantity say from 0.25 part to 10 parts of the purified sodium salt of the green sulphonic acids dry basis are dissolved in 100 parts of water. The bituminous material is then added, preferably in a continuous stream, while the mass is mixed either by the use of a paddle or by mechanical agitation. The bituminous material is preferably added in a molten condition and the solution of the salts of green sulphonic acids and water is preferably maintained at a temperature of from 150° F. to 212° F. The bituminous material may be added in relatively large proportions if desired, depending upon the degree of fluidity required, although ordinarily from 5 parts of bituminous material up to 300 parts would be employed for 100 parts of water.

The bituminous material is preferably a material solid at normal temperatures, although preferably added in fluid condition. While dispersions of solid material are sometimes referred to as suspensions, all such dispersions of bituminous material whether the bituminous material is solid or liquid at normal temperatures, will be herein referred to as emulsions.

For making emulsions of extraordinary stability, finely divided clay, for example from .25 part to 10 parts of the finely divided clay hereinbefore referred to, preferably colloidal clay, are suspended in 100 parts of water in the presence of from 0.25 part to 10 parts dry basis of a water soluble salt of the green sulphonic acids hereinbefore referred to, preferably the sodium salt thereof. While I may employ the salts of the green petroleum sulphonic acids as formerly prepared, I find that exceptionally favorable results are obtained by the use of the water soluble salts (e.g. the sodium salts) of the green petroleum sulphonic acids after separation of the non-acid organic compounds therefrom, for example, by the separation process hereinabove described. The bituminous material is then dispersed into the suspension of clay and water containing the sodium salts of the green petroleum sulphonic acids. The bituminous material is preferably added in a fluid condition. As an example, from 5.0 parts of bituminous material up to 300 parts may be added to 100 parts of water containing clay and salts of the green sulphonic acids.

This procedure renders it particularly easy to form the desired emulsion as very little stirring is necessary, and the dispersion of the bituminous material may, for example, be accomplished by the use of a manually operated paddle in an open tank, although mechanical means may be employed if desired. The emulsion produced is characterized by exceptional stability to even concentrated electrolytes and is suitable for all the various uses to which such emulsions have been heretofore applied with additional advantages resulting from its superior resistance to destruction of the emulsion by chemicals, freezing, etc.

While I have described the product and procedure with considerable definiteness, the invention is not to be limited thereby, as other ways of carrying the invention into effect may be used within the broad scope of my disclosure, and it is therefore my intention that the invention be limited only by the appended claims or their equivalents in which I have endeavored to claim broadly all inherent novelty.

I claim:

1. The method of producing stable bituminous emulsions from impure green petroleum sulphonic acids produced by the treatment of petroleum oil with sulphuric acid and containing non-acid organic compounds, which comprises separating the green petroleum sulphonic acids from the associated non-acid organic compounds by dissolving the said sulphonic acids in an aqueous solution of an alcohol of not exceeding 3 carbon atoms in which the same are relatively soluble and the non-acid organic compounds are relatively insoluble notwithstanding the presence of the sulphonic acids, forming the salts of the said separated sulphonic acids with an alkali metal selected from the group consisting of sodium and potassium by neutralizing the said sulphonic acids with the base of an alkali metal selected from the group consisting of sodium and potassium, dissolving the said salt in water, thereby forming a solution, and admixing bituminous material with the solution so formed.

2. Process according to claim 1, in which the aqueous solution of an alcohol of not exceeding 3 carbon atoms contains from 40 to 60% alcohol by volume.

3. The method of producing stable bituminous emulsions from impure green petroleum sulphonic acids produced by the treatment of petroleum oil with sulphuric acid and containing non-acid organic compounds, which comprises separating the green petroleum sulphonic acids from the associated non-acid organic compounds by dissolving the said sulphonic acids in an aqueous solution of an alcohol of not exceeding 3 carbon atoms in which the same are relatively soluble and the non-acid organic compounds are relatively insoluble notwithstanding the presence of the sulphonic acids, forming the salts of the said separated sulphonic acids with an alkali metal selected from the group consisting of sodium and potassium by neutralizing the said sulphonic acids with the base of an alkali metal selected from the group consisting of sodium and potassium, dissolving the said salt in water, thereby forming a solution, admixing a colloidal clay with the said solution, and thereafter admixing bituminous material with the said solution.

4. Process according to claim 3, in which the aqueous solution of an alcohol of not exceeding 3 carbon atoms contains from 40 to 60% alcohol by volume.

5. The method of producing stable bituminous emulsions from impure green petroleum sulphonic acids produced by the treatment of petroleum oil with sulphuric acid and containing non-acid organic compounds, which comprises forming the salts of said sulphonic acids with an alkali metal selected from the group consisting of sodium and potassium by neutralizing the said sulphonic acids with the base of an alkali metal selected from the group consisting of sodium and potassium, thereafter dissolving the said sulphonic acids in an aqueous solution of an alcohol of not over 3 carbon atoms in which the same are relatively soluble and the non-acid organic compounds are relatively insoluble notwithstanding the presence of the sulphonic acids, thereafter dissolving the purified salt of the said sulphonic acids in water, thereby forming a solution, and admixing bituminous material with the solution so formed.

6. Process according to claim 5, in which the aqueous solution of an alcohol of not exceeding 3 carbon atoms contains from 40 to 60% alcohol by volume.

7. The method of producing stable bituminous emulsions from impure green petroleum sulphonic acids produced by the treatment of petroleum oil with sulphuric acid and containing non-acid organic compounds, which comprises forming the salts of said green petroleum sulphonic acids with an alkali metal selected from the group consisting of sodium and potassium by neutralizing the said sulphonic acids with the base of an alkali metal selected from the group consisting of sodium and potassium, thereafter dissolving the said sulphonic acids in an aqueous solution of an alcohol of not exceeding 3 carbon atoms in which the same are relatively soluble and the non-acid organic compounds are relatively insoluble notwithstanding the presence of the sulphonic acids, thereafter dissolving the purified salt of the said sulphonic acids in water, thereby forming a solution, admixing a colloidal clay with the said solution, and thereafter admixing bituminous material with the said solution.

8. Process according to claim 7, in which the aqueous solution of an alcohol of not exceeding 3 carbon atoms contains from 40 to 60% alcohol by volume.

LEO LIBERTHSON.